Jan. 11, 1949. N. N. OKUN 2,458,628
VEST-POCKET CIRCUIT TESTING DEVICE
Filed June 14, 1944
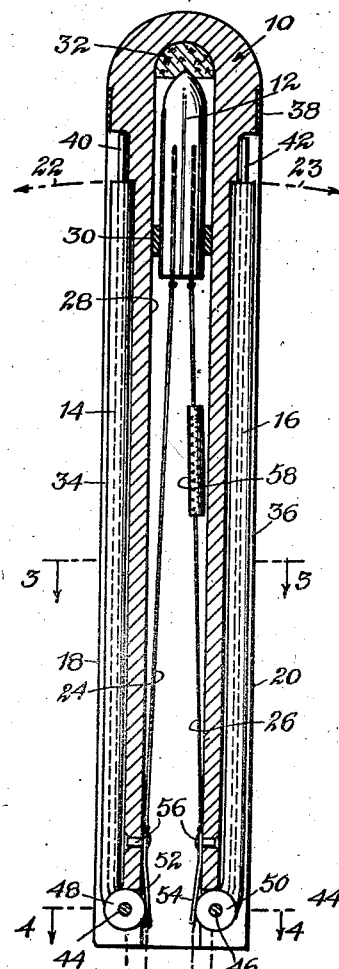
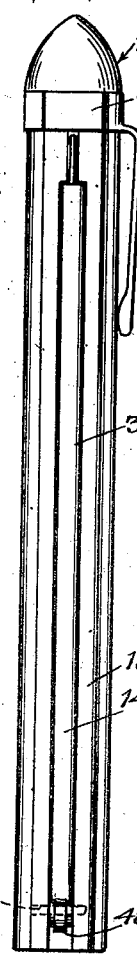
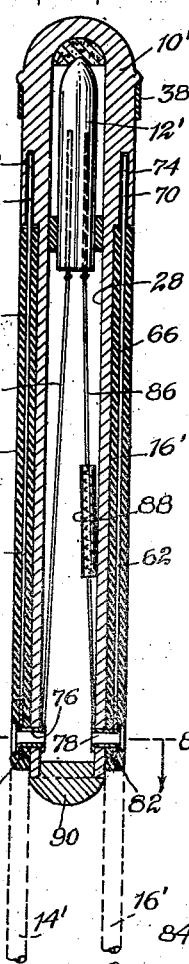
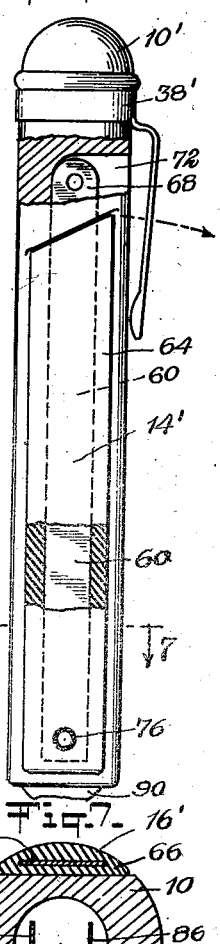
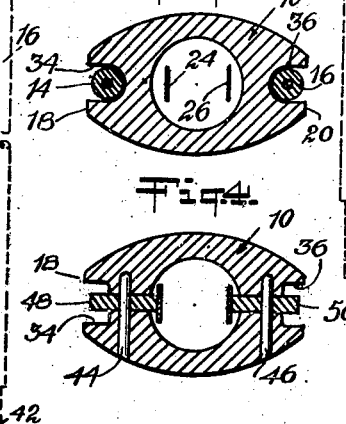
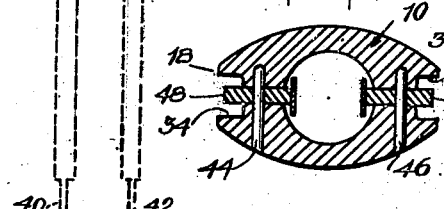
INVENTOR.
Nathaniel N. Okun
BY
James K. Franklin
Attorneys Patented Jan. 11, 1949

2,458,628

UNITED STATES PATENT OFFICE 2,458,628

VEST-POCKET CIRCUIT TESTING DEVICE

Nathaniel N. Okun, Bronx, N. Y.

Application June 14, 1944, Serial No. 540,199

4 Claims. (Cl. 175—183)

1

This invention relates to a vest pocket circuit testing device.

The prime object of my present invention centers about the provision of a circuit testing device adapted to be carried conveniently in the vest or coat pocket of the user and designed so that it may be readily contracted or collapsed into inoperative carrying condition and readily extended or set up into operative testing condition.

The main desiderata in a portable and pocketable circuit testing instrument are twofold:

(1) The instrument should be so constructed that circuit points at differing, and at times widely differing, spacing may be tested therewith. To this end, the testing points of the instrument should be adjustable to various spacings.

(2) The instrument should be so constructed that when collapsed, it should occupy small and pocketable confines and so that, when collapsed, the testing points, and preferably also the arms carrying the testing points, should be enclosed or boxed and thereby protected against being caught by foreign objects, such, for example, as by any article of clothing of the user, if carried in the user's pocket, etc.

The principal object of my present invention resides in the provision of a circuit testing instrument which fulfills these desiderata.

To the accomplishment of this main object of the invention and such objects as may hereinafter appear, my invention relates to the vest pocket circuit testing instrument sought to be defined in the appended claims and described in the following specification taken together with the accompanying drawings, in which—

Fig. 1 is a vertical elevational view taken in longitudinal cross-section of one embodiment of the vest pocket circuit testing device of my present invention, showing the device in both the assumed contracted or collapsed condition and an extended or set-up condition;

Fig. 2 is a side elevational view thereof;

Fig. 3 is a view thereof shown on an enlarged scale and taken in cross-section in the plane of the line 3—3 of Fig. 1;

Fig. 4 is a view similar to Fig. 3 but taken in cross-section in the plane of the line 4—4 of Fig. 1;

Fig. 5 is a vertical elevational view taken in cross-section, similar to the view shown in Fig. 1 and showing a modified embodiment of the invention;

Fig. 6 is a side elevational view of the modification shown in Fig. 5;

2

Fig. 7 is a view shown on an enlarged scale and taken in cross-section in the plane of line 7—7 of Fig. 6; and Fig. 8 is a view corresponding to the view of Fig. 7 but taken in cross-section in the plane of the line 8—8 of Fig. 5.

Referring now more in detail to the drawings and to the modification shown in Figs. 1-4 thereof, the circuit testing device comprises, in its essential features, a holder generally designated as 10, adapted to be inserted into the pocket of the user, said holder being in the form of an elongated body of small cross-sectional area, the elongation of the body being depicted in Figs. 1 and 2 of the drawings and the cross-sectional area thereof being illustrated in Figs. 3 and 4 of the drawings, the said holder 10 carrying or containing a circuit testing lamp 12 and being provided with a pair of extendable test arms 14 and 16 movably mounted on opposite sides 18 and 20 of the holder 10 and movable outwardly from the holder in the directions indicated by the arrows 22 and 23 of Fig. 1 from the contracted position shown in full lines in Fig. 1 to extended testing positions, one of which is shown by the dotted lines in Fig. 1 of the drawings, these test arms being correspondingly movable inwardly when the device is changed from a set-up or testing condition to a collapsed or inoperative condition. As shown, in Figs. 1-3 of the drawings, the test arms in the contracted, inoperative position occupy space substantially within the cross-sectional area of the body 10 of the holder. Completing the structure of the testing device, the test arms 14 and 16 are connected to the circuit testing lamp 12 by means of conductive elements 24 and 26, arranged within the holder 10.

The holder 10, in the form of the invention shown in Figs. 1-4 of the drawings, comprises a central hollow body which may be made of a molded plastic, preferably of a transparent nature, such as a methyl methacrylate resin, which may be given the configuration depicted in Figs. 1-4 of the drawings. Preferably at the top of this holder and within the hollow center 28 thereof is mounted the circuit testing lamp 12 which may be in the form of any indicator but which is here shown in the form of a neon tube, said lamp 12 being held by the rubber annulus 30 adjacent its bottom and being lodged at its tip in the soft rubber body 32, by means of which the lamp is mounted in a shock-proof manner in the holder 10. The holder body 10 is also provided at its opposite sides with the hollowed out or socketed portions 34 and 36 which are designed to shieldingly house or contain the test arms 14 and 16 when the latter are in contracted or collapsed condition, this latter being particularly shown in Figs. 1–3 of the drawings. The upper part of the holder 10 may also be formed with a groove to receive the pocket retaining clip 38.

The test arms 14 and 16 may comprise, as shown, hard, flexible, rubber-coated leads having the exposed test points 40 and 42. These rubber-coated leads or test arms are preferably hingedly mounted at the bottom of the holder 10 at opposite sides thereof for movement about the hinge pivots 44 and 46, the tests arms being for this purpose provided at their bottom ends with washers 48 and 50 (which may be soldered to the conducting leads), said washers being rotatable in the hinge pintles 44 and 46 in the manner best shown in Fig. 4 of the drawings. By means of this construction, the test arms 14 and 16 are movable on their hinges arcuately in opposite directions between the contracted inoperative position shown in full lines in Fig. 1 to a variety of extended testing positions, one of which is indicated by the dotted lines in Fig. 1 of the drawings. In the contracted inoperative condition, the test arms 14 and 16 occupy space substantially within the confines or cross-sectional area of the body of the holder 10, and most particularly the test points 40 and 42 thereof are concealingly disposed within the body of the holder, the test arms and test points being for this purpose lodged in the socket portions 34 and 36 of the holder. As will be evident particularly from viewing Fig. 1 of the drawings, the test arms 14 and 16, when moved outwardly from their sockets in opposite directions, may be moved so that the test points 40 and 42 thereof may be disposed at any of a large number of spacings, each spacing corresponding to a particular radial position of a test arm.

The conductive elements 24 and 26 may be made in any desired way and, as shown, these conductive elements may comprise metal strips connecting the terminals of the circuit testing lamp 12, with the test arm washers 48 and 50, the bottoms 52 and 54 of the conducting strips 24 and 26 acting as brush elements in contact with the rotatable washers 48 and 50. The conducting strips may be secured in position in any desired way, as by means of the riveting elements 56. One of the conducting strips, such as the strip 26, may be provided with a suitable resistor in series circuit, such as the resistor 58.

In the modification shown in Figs. 5–8 of the drawings, the test arms, while hingedly arcuately movable on the holder, are movable in parallel planes at right angles with reference to the plane of movement of the test arms 14 and 16 of the first-described modification shown in Figs. 1–4. Here (Figs. 5–8), the holder 10', provided with the vest pocket clip 38' and containing the neon lamp 12' held in the central hollow 28' in a manner similar to that heretofore described, is given a substantially circular cross-sectional configuration at its top and a cross-sectional configuration through the rest of its body, such as shown in Figs. 7 and 8 of the drawings, such that, when the test arms 14 and 16 are moved to collapsed or contracted condition, these test arms, together with the body 10, occupy a substantially circular cross-sectional area, this being best shown in Figs. 7 and 8 of the drawings.

In this inventive form, the test arms comprise metallic strips 60 and 62 lodged within rubber or other molded casings 64 and 66, the strips being provided with the exposed test points or portions 68 and 70, which latter, when the test arms are moved to the inoperative position, are moved into and are seated within slit sockets 72 and 74 formed in the body 10' of the holder.

The test arms 14' and 16' are hingedly mounted at the bottom of the holder 10' by means of the rivets or grommets 76 and 78; and for obtaining good conductive contact, these hinged elements may include the Phosphor bronze tension washers 80 and 82.

The conductive elements connecting the hinged elements of the test arms with the lamp terminals comprise the conductive strips 84 and 86, the latter including, preferably, the series resistor 88 and these conductive strips may be connected directly at their bottoms to the rivet elements 76 and 78, as best shown in Fig. 5 of the drawings. The bottom of the holder 10' may, if desired, be closed by means of the movable cap 90.

In this modified form of the invention, as in the form first described, the test arms 14' and 16' are movable on their hinges arcuately in opposite directions outwardly and inwardly between the collapsed or contracted condition shown in Figs. 5 and 6 of the drawings to a number of extended testing positions, the test arms in the contracted condition occupying space substantially within the area of the body of the holder, with the test tips thereof disposed within housing sockets, and the test arms are movable to extended positions with their test tips at variable spacings.

The vest pocket circuit testing device of my present invention, and the manner of making and using the same, and the advantages thereof, will in the main be fully apparent from the above detailed description thereof. In both exemplified forms of the invention, the desired objects described are achieved in high measure. The instrument, in collapsed condition, occupies small and pocketable confines and the same may be carried in the vest or coat pocket of the user after the manner of an ordinary pencil or pen by means of the clip 38 or 38'. In collapsed condition, the test arms are lodged within the area or confines of the holder and the test points are enclosed, boxed or housed and thereby protected against being caught by foreign objects. When the instrument is desired to be used, the test arms may be readily opened up and moved to positions for a variety of circuit point spacings.

While I have described the instrument or device in the preferred forms, it will be apparent that changes may be made in the construction thereof without departing from the spirit of the invention defined in the following claims.

I claim:

1. A vest pocket circuit testing device comprising an elongated holder of small cross-sectional area having a hollowed center and a pair of exterior housing portions extending lengthwise of said holder on opposite sides thereof, a circuit testing lamp carried by said holder in its hollowed center and visible through a wall of said holder, a pair of elongated test arms each articulately mounted on said holder at the lower end of one of said exterior housing portions so as to be movable outwardly and inwardly thereon between an extended testing position and a contracted inoperative position, the test arms in the contracted inoperative position lying parallel to said holder in said exterior housing portions so as to be substantially enclosed within the cross-sectional area of said holder, and conductive elements within said holder connecting the test arms in series with said circuit testing lamp.

2. A vest pocket circuit testing device comprising an elongated holder of small cross-sectional area having a hollowed center and a pair of exterior housing portions extending lengthwise of said holder on opposite sides thereof, a circuit testing lamp carried by said holder in the upper portion of said hollowed center and visible through a wall of said holder, and a pair of elongated test arms each articulately mounted on said holder at the lower end of one of said exterior housing portions and movable outwardly and inwardly with respect to said housing portions between an extended testing position and a contracted inoperative position, the test arms in the contracted inoperative position lying parallel to the holder in said housing portions so as to be substantially enclosed within the cross-sectional area of said holder, and conductive elements within said hollowed center connecting said test arms in series with said circuit testing lamp.

3. A vest pocket circuit testing device comprising an elongated holder of small cross-sectional area having a hollowed center and a pair of exterior housing portions extending lengthwise of said holder on opposite sides thereof, said holder being formed at least at its upper portion of a transparent material, a circuit testing lamp carried by the holder in the upper portion of said hollowed center and visible through said transparent upper portion of said holder, a pair of elongated test arms terminating in test points each hingedly mounted at one of its ends on said holder at the lower end of one of said exterior housing portions, said test arms being movable on their hinges arcuately in opposite directions between extended testing positions and a contracted inoperative position, the test arms in the contracted inoperative position lying parallel to the holder in the exterior housing portions so as to be substantially enclosed within the confines of the body of said holder, the test arms being movable to extended positions with their test tips in variable spacings, and conductive elements within said hollowed center connecting the test arms at their hinged mountings in series with said circuit testing lamp.

4. A vest pocket circuit testing device comprising an elongated holder of small cross-sectional area having a hollowed center and a pair of exterior housing portions extending lengthwise of said holder on opposite sides thereof, a circuit testing lamp carried by said holder, a pair of elongated test arms terminating in test points each hingedly mounted on said holder at the lower end of one of said exterior housing portions, said test arms being movable on their hinges arcuately in opposite directions outwardly and inwardly between extended testing positions and a contracted inoperative position, said holder being formed with sockets in line with said exterior housing portions, the test arms in the contracted inoperative position lying parallel to the holder in said housing portions so as to be substantially enclosed within the cross-sectional area of said holder with said test tips disposed within said sockets, the test arms being movable to extended positions with their test tips at variable spacings, and conductive elements within said hollowed center connecting the test arms in series with said circuit testing lamp.

NATHANIEL N. OKUN.

REFERENCES CITED

The following references are of record in the file of this patent:

UNITED STATES PATENTS

| Number | Name | Date |
|---|---|---|
| 1,385,222 | Miller | July 19, 1921 |
| 1,679,786 | Roberts | Aug. 7, 1928 |
| 1,696,333 | Shire | Dec. 25, 1928 |
| 1,989,645 | Podell | Jan. 29, 1935 |
| 2,023,916 | Dante | Dec. 10, 1935 |
| 2,324,661 | Woodington | July 20, 1943 |

FOREIGN PATENTS

| Number | Country | Date |
|---|---|---|
| 152,852 | Great Britain | Oct. 28, 1920 |
| 180,835 | Great Britain | June 8, 1922 |
| 205,218 | Great Britain | Oct. 15, 1923 |
| 369,849 | Great Britain | Mar. 31, 1932 |